United States Patent [19]

Admassu

[11] Patent Number: 4,843,733

[45] Date of Patent: Jul. 4, 1989

[54] PROCESS FOR DRYING WATER-WET POLYCARBONATE MEMBRANES

[75] Inventor: Wudneh Admassu, Concord, Calif.

[73] Assignee: The Dow Chemical Company, Midland, Mich.

[21] Appl. No.: 192,275

[22] Filed: May 10, 1988

[51] Int. Cl.$^4$ .............................................. F26B 3/08
[52] U.S. Cl. ............................................. 34/9; 34/36
[58] Field of Search ............ 34/9, 60; 210/651, 500.4, 210/500.23; 55/16

[56] References Cited

U.S. PATENT DOCUMENTS

| | | | |
|---|---|---|---|
| 3,592,672 | 7/1971 | Rowley et al. | |
| 3,709,774 | 1/1973 | Kimura. | |
| 3,842,515 | 10/1974 | MacDonald et al. | 34/9 |
| 4,032,309 | 6/1977 | Salemme. | |
| 4,048,271 | 9/1977 | Kesting. | |
| 4,068,387 | 1/1978 | Manos | 34/9 |
| 4,080,743 | 3/1978 | Manos | 34/9 |
| 4,080,744 | 3/1978 | Manos | 34/9 |
| 4,120,098 | 10/1978 | Manos | 34/9 |
| 4,219,517 | 8/1980 | Kesting. | |
| 4,430,807 | 2/1984 | Davis et al. | 34/9 |
| 4,715,960 | 12/1967 | Thompson | 210/500.4 X |
| 4,772,392 | 9/1988 | Sanders, Jr. et al. | 210/500.4 X |

FOREIGN PATENT DOCUMENTS

| | | |
|---|---|---|
| 219804A | 3/1985 | German Democratic Rep. |
| 42-21300 | 10/1967 | Japan. |
| 62-038207 | 2/1987 | Japan. |

*Primary Examiner*—Henry A. Bennet

[57] ABSTRACT

The invention is a process for drying water-wet polycarbonate membranes by contacting the membrane with a pretreatment fluid containing at least one $C_{1-4}$ alcohol to remove residual solvent and non-solvent and/or tighten the membrane discriminating layer, followed by drying the membrane with air or an inert gas to evaporate the alcohol and/or water.

16 Claims, No Drawings

PROCESS FOR DRYING WATER-WET POLYCARBONATE MEMBRANES

BACKGROUND OF THE INVENTION

This invention relates to a process for drying water-wet polycarbonate membranes.

The use of polymeric membranes for gas separation is well known. A wide variety of polymers have been used for gas separation membranes, including cellulose esters, polyamides, polyimides, and polyolefins. An application of particular interest is membrane separation of oxygen and nitrogen from air. For example, enriched nitrogen streams obtained from air may be used for inert padding of flammable fluids or for food storage; enriched oxygen streams obtained from air may be used for enhancing combustion or for increasing the efficiency of fermentation processes.

The membranes used for gas separation are generally dry so that the most effective membrane separation performance can be achieved. However, many membranes are formed by the wet process, in which a solution of polymer, solvent(s) and optional non-solvent(s) is cast or extruded, the solvent(s) and non-solvent(s) optionally allowed to partially evaporate, followed by immersion in a coagulating liquid bath, often water. Thus, the membranes formed by the wet process are liquid-wet and preferably are dried prior to use for gas separation. The art teaches that care must be taken during the drying process to maintain the physical structures of the membranes because structural changes such as pore collapse or crazing result in adverse membrane performance. The art discloses several techniques for drying water-wet cellulose ester membranes so that the physical structures of the membranes are preserved. One such method is freeze drying. Another method involves sequentially contacting the cellulose ester membranes with polar and non-polar solvents. The purpose of the sequential solvent method is to sufficiently reduce the polymer-water interaction by replacing water with a non-polar solvent, thus lowering the surface tension, so that the membranes may be dried without an adverse impact on the structures of the membranes. The problem is that such techniques are expensive, time consuming, and generate large volumes of solvent for disposal. Furthermore, such techniques often introduce sources of variation in membrane performance.

Polycarbonate membranes in particular have been found to have good separation properties for oxygen and nitrogen. Polycarbonate membranes formed by the wet process generally are porous or asymmetric, depending on the extrusion or casting conditions. Porous membranes may be used as supports for composite gas separation membranes. Composite membranes possess a thin, dense discriminating layer. Assymmetric membranes possess a thin, dense discriminating layer supported on a porous substructure of the same material. The discriminating layer provides the membrane with gas separation capability. The membrane discriminating layer is preferably as thin as possible while still maintaining the ability to separate gases in order that the highest possible gas flux through the membrane may be achieved. POWADIR membranes may also be fabricated by the wet process. POWADIR membranes possess one or more discriminating regions capable of separating gases and one or more porous regions. An asymmetric membrane is a POWADIR membrane, but a POWADIR membrane is not necessarily asymmetric.

Polycarbonate membranes formed by the wet process may be directly dried in air. However, such polycarbonate membranes generally contain small amounts of residual solvent and non-solvent even after leaching and annealing which adversely affect the performance of the dried membranes. The presence of even small amounts of residual solvent and non-solvent in the dried membranes can result in reduced gas flux, reduced separation factor (selectivity), and increased compaction rate. An inexpensive, timely, and reproducible method of drying polycarbonate membranes which enhances separation properties through the removal of residual solvent and non-solvent prior to drying is needed. Furthermore, polycarbonate membranes formed by the wet process may possess a lower than optimal gas selectivity because of microscopic deficiencies in the membrane's morphological structure. For example, the discriminating layer may contain microscopic defects interrupting the continuity of the discriminating layer, resulting in a less than optimal gas selectivity, or the discriminating layer may not be "dense" enough, that is, the pores in the discriminating layer may not be sufficiently small so that the discriminating layer is capable of efficiently separating gases. Therefore, a process is also needed which results in increased gas selectivity through a modification of the membrane's morphology by "tightening" the discriminating layer without producing a significant decrease in the gas flux through the membrane. A single process which results in improved membrane separation performance through both removal of residual solvent and non-solvent and modification of the membrane's morphological structure would be particularly advantageous.

SUMMARY OF THE INVENTION

What has now been discovered is a process for drying a water-wet polycarbonate membrane comprising the steps of
1. contacting at least one side of the membrane with a pretreatment fluid containing at least one $C_{1-4}$ alcohol, under conditions such that the alcohol modifies the membrane's morphological structure so that the gas selectivity of the membrane is thereby increased, and
2. drying the membrane by contacting at least one side of the membrane with air or an inert gas under conditions such that substantially all of the alcohol and/or water is evaporated from the membrane.

The invention process produces polycarbonate membranes with increased flux and/or separation factor compared with polycarbonate membranes which have been directly air dried without any pretreatment prior to drying.

DETAILED DESCRIPTION OF THE INVENTION

This invention relates to a process for drying water-wet polycarbonate membranes. Water-wet refers to membranes containing a substantial amount of water. For example, following manufacture, water-wet polycarbonate membranes generally contain greater than about 30 weight percent water. The water-wet membranes may contain up to as much as about 70 weight percent water. The drying process preferably reduces the concentration of water present in the membrane to below about 1.0 weight percent, more preferably to below about 0.3 weight percent. Most preferably, the drying process reduces the concentration of water present in the membrane to the concentration of water present in the ambient air.

The drying process may be used for polycarbonate membranes, particularly for membranes in which the polycarbonates are derived from bisphenols. The drying process is preferably used on polycarbonate membranes wherein a significant portion of the bisphenols used to prepare the polycarbonates possess substituents on the phenolic rings. Preferably at least about 25 percent of the bisphenols in the polymer backbone possess substituents on the phenolic rings. Preferably the bishpenols used to prepare the polycarbonates are tetrasubstituted. The substituents are preferably located at the 3,5 positions on the phenolic rings.

The polycarbonates useful in this invention preferably comprise polymers with backbone units corresponding to Formula 1:

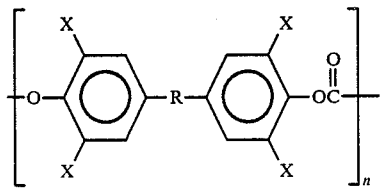

Formula 1 wherein

R is independently in each occurrence —CO—, —S—, —SO$_2$—, —0—, a C$_{1-6}$ divalent hydrocarbon radical, an inertly substituted C$_{1-6}$ hydrocarbon radical, or a C$_{1-6}$ divalent halocarbon radical;

X is independently in each occurrence H, Cl, Br, F, a C$_{1-4}$ alkyl, or a C$_{1-4}$ haloalkyl; and n is a positive real number of about 20 or greater.

R is preferably a C$_{1-6}$ divalent hydrocarbon, more preferably a C$_{1-6}$ alkylidene radical, most preferably an isopropylidene radical. X is preferably H, Cl, Br, F, or methyl. n is preferably a positive real number of about 35 or greater. An especially preferred bisphenol of Formula 1 useful in this invention is 2,2-bis(3,5-bromo-4-hydroxyphenyl)propane.

Method of synthesizing such polycarbonates are well known in the art. See U.S. Pat. Nos. 3,038,874; 3,119,787; 3,153,008; 3,248,366; 3,334,154; 3,409,704; 3,829,266; 3,912,687; and 4,413,103, the relevant portions incorporated herein by reference. See also Encyclopedia of Polymer Science, Interscience Division of John Wiley and Sons, N.Y., N.Y., 1969, Vol. 10, pp. 714–725, the relevant portions incorporated herein by reference.

The water wet polycarbonate membranes which may be dried by the inventive process ma be manufactured by methods known in the art. Such membranes may be fabricated in the form of flat sheets, hollow tubes, or hollow fibers. One preferred method of producing such membranes is to extrude a polymer blend of the polymer, a solvent, and a non-solvent. An example of a preferred solvent is N-methylpyrrolidone. An example of a preferred non-solvent is triethylene glycol. The polymer blend preferably contains from about 30 to about 60 weight percent polymer. The preferred solvent/non-solvent ratio is between about 1.7 and about 5.1. The polymer blend is extruded, immersed in a water quench bath, then optionally leached and annealed in water. A further description of the preferred extrusion process, including preferred solvents and non-solvents, is contained in co-pending U.S. patent application Serial No. 118,119, filed November 6, 1987, incorporated herein by reference.

Following manufacture, the polycarbonate membranes usually contain residual solvent and non-solvent. For example, polycarbonate membranes formed by the process described in U.S. Pat. No. 4,772,392 generally contain from about 0.5 to about 3.0 weight percent residual solvent and non-solvent as extruded. The presence of residual solvent and non-solvent in the membranes adversely affects membrane performance. Therefore, the residual solvent and non-solvent are preferably removed prior to drying. The polycarbonate membranes may optionally be first contacted with water, preferably at a temperature of from about 30 to about 60 degrees Celsius, for a time sufficient to remove at least a portion of the residual solvent and non-solvent remaining in the membrane after extrusion. The polycarbonate membranes are then preferably contacted with a pretreatment fluid to remove substantially all the residual solvent and non-solvent. Following contacting with the pretreatment fluid, the polycarbonate membranes preferably contain less than about 0.5 weight percent solvent and non-solvent, more preferably less than about 0.1 weight percent solvent and non-solvent, most preferably less than about 0.05 weight percent solvent and non-solvent. The amounts of residual solvent and non-solvent in the polycarbonate membranes are readily determined by conventional gas chromatography using a flame ionization detector with internal or external standard. Following removal of substantially all of the residual solvent and non-solvent, the gas flux of the membrane is preferably increased by at least about 10 percent, more preferably by at least about 25 percent, most preferably by at least about 50 percent. The pretreatment fluid preferably tightens the discriminating layer of the membranes, thereby improving gas selectivity without a significant decrease in gas flux. Treating the membrane with the pretreatment fluid preferably increases the gas selectivity of the membranes at least about 3 percent, more preferably at least about 5 percent. The pretreatment fluid preferably both removes residual solvent and non-solvent and tightens the membrane discriminating layer, resulting in increased gas flux and gas selectivity.

Contacting the membrane with the pretreatment fluid may take place as a batch or continuous process, for example by immersing the membrane in the pretreatment fluid. Alternately, the membrane may be flushed with the pretreatment fluid. In the case of hollow fiber membranes, the pretreatment fluid may be passed over the outside of the hollow fibers and/or passed down the bores of the hollow fibers.

Removal of the solvent and non-solvent from the membrane depends on a number of factors, including the solvent(s) used in the pretreatment fluid, pretreatment solvent concentration, volume of pretreatment fluid, pretreatment fluid temperature, and duration of contact with the pretreatment fluid.

The pretreatment fluid must not dissolve the polycarbonate membrane, preferably is a solvent for the residual solvent and non-solvent, preferably tightens the membrane discriminating layer, and must have a sufficiently high vapor pressure so that it can be readily evaporated from the membrane following pretreatment. Low molecular weight alcohols are preferred for use as components in the pretreatment fluid. Preferred low molecular weight alcohols used in the pretreatment fluid are $C_{1-4}$ alcohols or mixtures thereof. More preferred alcohols are methanol, ethanol, or mixtures thereof.

At least one side of the membrane is contacted with the pretreatment fluid. The pretreatment fluid preferably is a gas or a liquuid; more preferably the pretreatment fluid is a liquid. The concentration of alcohol in the pretreatment fluid may vary significantly. A pretreatment fluid of 100 volume percent alcohol is operable. Preferred concentrations are dependent upon a combination of factors, for example, membrane performance, ability of the pretreatment fluid to extract the solvent and non-solvent, ability of the pretreatment fluid to tighten the membrane discriminating layer, cost of the alcohol, flammability of the pretreatment fluid, and disposal of the alcohol. In the preferred embodiment wherein the pretreatment fluid is a liquid, the alcohol solution preferably contains from about 5 to about 50 volume percent alcohol in water; more preferably from about 10 to about 25 volume percent alcohol in water.

In the preferred embodiment wherein the pretreatment fluid is a liquid, the volume of extracting fluid used should be such that the concentrations of solvent and non-solvent in the pretreatment fluid do not reach a level high enough to significantly impede extraction of the solvent and non-solvent. A continuous flushing process will use less pretreatment fluid than a batch process since in a batch process the stagnant boundary layer may contain high levels of residual solvent and non-solvent which impede extraction. In the preferred embodiment wherein the pretreatment fluid is a liquid, the volume of alcohol solution used is preferably at least about 2 milliliters per (centimeter)$^2$ of membrane surface area, more preferably at least about 5 milliliters per (centimeter)$^2$ of membrane surface area.

The maximum temperature of the pretreatment fluid is below the temperature at which membrane integrity is adversely affected. The maximum temperature of the pretreatment fluid is preferably less than about 60 degrees Celsius, more preferably less than about 50 degrees Celsius. The minimum temperature of the pretreatment fluid is preferably greater than about 5 degrees Celsius, more preferably greater than about 15 degrees Celsius. Contacting the membrane with pretreatment fluid at ambient temperature is often convenient.

The pretreatment time is that which is sufficient to remove substantially all of the residual solvent and non-solvent and/or sufficiently tighten the membrane discriminating layer so that gas selectivity is improved. The pretreatment time is preferably between about 0.5 to about 24 hours, more preferably between about 1 to about 6 hours at a temperature of about 25 degrees Celsius.

Following contact with the pretreatment fluid, the membrane is dried. The membrane is dried by contacting a least one side of the membrane with air or an inert gas such as helium, nitrogen, or argon under conditions which remove substantially all of the residual alcohol and/or water. The gas used to dry the membrane should be sufficiently free of water and alcohol so as to enable removal of water and alcohol from the membrane. The membrane may be dried by exposing the membrane to the drying gas or by blowing the drying gas past the surface of the membrane. In the case of hollow fiber membranes, the drying gas may be passed over the outside of the hollow fibers and/or passed down the bores of the hollow fibers. Preferably drying takes place by blowing the drying gas past the surface of the membrane because such a technique avoids a build up of the alcohol and water concentrations in the boundary layer of the drying gas next to the membrane surface which impedes drying. Drying of the membranes may take place as a batch or continuous process. Drying of the membrane may also take place as a membrane module is being fabricated. In the case of hollow fiber membrane modules, this may be accomplished by passing the drying gas down the core of the module to radially distribute the drying gas through the membrane bundle, or by otherwise introducing drying gas to the shellside or tubeside of the module.

The maximum drying temperature is below that temperature at which membrane integrity is adversely affected. The membrane is preferably dried at a temperature less than about 80 degrees Celsius, more preferably less than about 50 degrees Celsius. The minimum drying temperature is the lowest temperature at which drying, that is, evaporation of the water and alohol, takes place at a reasonable rate. The minimum drying temperature is preferably greater than about 5 degrees Celsius, more preferably greater than about 15 degrees Celsius. Drying at ambient temperature is often convenient.

Drying may take place by exposing the membrane to the drying gas. Drying preferably occurs by blowing the drying gas past the surface. In such an embodiment, the minimum flowrate of gas used to dry the membrane should be such that the concentrations of alcohol and/or water in the drying gas do not reach a level high enough to significantly impede drying of the membrane. The flowrate of gas used to dry the membrane is preferably at least about 1 standard cubic foot per square foot of membrane area per hour (schfh/ft$^2$) (0.3048 standard cubic meters per square meter per hour), more preferably at least about 3 scfh/ft$^2$ of membrane area (0.9144 standard cubic meters per square meter per hour). The maximum flowrate of the drying gas is that flowrate which is practically achieved. In the embodiment wherein the membrane is dried by blowing the drying gas down the bores of hollow fiber membranes, the pressure drop along the length of the membranes will dictate the practical limit on the flowrate of the drying gas.

The drying time is that which is sufficient to remove substantially all of the alcohol and/or water from the membrane. The drying time is preferably between about 1 to about 10 hours, more preferably between about 2 to about 6 hours at a temperature of about 25 degrees Celsius.

The membranes dried by the inventive process are used to isolate or recover gases from gaseous mixtures. When mounted in a gas separation device so as to provide two regions separated by the membrane, one side of the membrane is contacted with a feed gas mixture under pressure, while a pressure differential is maintained across the membrane. At least one of the components in any given gas mixture selectively permeates through the membrane more rapidly than the other components. A stream is obtained on the low pressure side of the membrane which is enriched in at least one faster permeating component. The permeated gas is removed from the low pressure (downstream side) of the membrane. A stream depleted in at least one faster permeating component is withdrawn from the high pressure (upstream) side of the membrane. The membranes are of particular use in the separation of oxygen and nitrogen from air. In such embodiments, oxygen selectively permeates through the membrane more rapidly than nitrogen.

Gas permeability is defined as $$P = \frac{(\text{amount of permeant})(\text{membrane thickness})}{(\text{area})(\text{time})(\text{driving force gradient across the membrane})}$$

A standard permeability unit is the Barrier, which is equal to $$\frac{(\text{centimeter})^3 \, (STP) \, (\text{centimeter})}{(\text{centimeter})^2 \, (\text{second}) \, (\text{centimeter Hg})} \times 10^{10},$$

where STP stands for standard temperature and pressure, abbreviated hereinafter as $$\frac{cm^3 \, (STP) \, cm}{cm^2 \, s \, cm \, Hg} \times 10^{10}.$$

The gas flux is defined as (permeability) membrane thickness). A standard flux unit is $$\frac{(\text{centimeter})^3 \, (STP)}{(\text{centimeter})^2 \, (\text{second}) \, (\text{centimeter Hg})}$$

abbreviated hereinafter as $$\frac{cm^3 \, (STP)}{cm^2 \, s \, cm \, Hg}.$$

The gas separation factor (gas selectivity), alpha, is the ratio of the permeability or flux of the faster permeating gas to the permeability or flux of the slower permeating gas.

In the embodiment where oxygen is separated from nitrogen, the polycarbonate membranes dried by this inventive process preferably have a separation factor for oxygen/nitrogen of at least about 6, more preferably at least about 7. The permeability of oxygen at about 25 degrees Celsius is at least about 0.9 Barrers, more preferably at least about 2 Barrers. The flux of oxygen at about 25 degrees Celsius is preferably at least about $6 \times 10^{-6}$ $$\frac{cm^3 \, (STP)}{cm^2 \, s \, cm \, Hg}, \text{ more preferably at least about } 10 \times$$

$$10^{-6} \frac{cm^3 \, (STP)}{cm^2 \, s \, cm \, Hg}$$

SPECIFIC EMBODIMENTS

EXAMPLE 1

Effect of Residual Solvent on Membrane Performance

This example is not an illustration of the invention but is intended to illustrate the negative effect of residual solvent on membrane performance. To determine the effect of residual solvent on membrane performance, films of tetrabromobisphenol A polycarbonate (2,2-bis(3,5-dibromo-4-hydroxyphenyl)propane) are cast from methylene chloride solutions containing various levels of N-methylpyrrolidone. The films are cast onto glass plates and covered with a second glass plate to reduce the rate of solvent evaporation. The films are then removed from the glass plates, dried in air overnight, and placed in a vacuum oven at about 1 pound per square inch absolute pressure at about 60 degrees Celsius to remove the methylene chloride. In the case of the 5.9 weight percent N-methylpyrrolidone film, the film once cast and covered is placed in a nitrogen-purged dry box. An infrared lamp is used to heat the sample to about 54 degrees Celsius to aid in volatilizing excess N-methylpyrrolidone. Film thicknesses vary from 1.3 to 1.6 mils.

Permeabilities of oxygen and nitrogen are measured by the constant volume/variable pressure method, using pure gases as feed at a pressure of about 50 psig at about 25 degrees Celsius. Further descriptions of the permeability measurement method are contained in *Methods of Experimental Physics,* Vol. 16c, Academic Press, Inc., 1980, pp. 315–377 and Pye, Hoehn, and Panar, "Measurement of Gas Permeability of Polymers. I. Permeabilities in Constant Volume/Variable Pressure Apparatus," *Journal of Applied Polymer Science,* Vol. 20, 1976, pp. 1921–1931, both incorporated herein by reference.

The levels of residual N-methylpyrrolidone in the membranes are determined by gas chromatography using a flame ionization detector with an internal or external standard. A fused silica capillary column, obtained from J.N.W. Scientific Inc. under the product designation DB5, is used. The injection sample is prepared by dissolving a portion of the membrane in methylene chloride. The polymer in the resulting solution is optionally precipitated from the solution with alcohol prior to injecting the sample into the gas chromatograph in order to prevent fouling of the column.

TABLE I

| EFFECT OF RESIDUAL SOLVENT | | |
|---|---|---|
| Residual Plasticizer (weight %) | $O_2/N_2$ Separaton Factor | $O_2$ Permeability (Barrers) |
| 5.9 | 5.9 | 0.68 |
| 1.0 | — | 0.9 |
| 0 | 8.4 | 1.0 |

The presence of residual N-methylpyrrolidone clearly reduces both the gas permeability and the gas separation factor of oxygen/nitrogen.

EXAMPLES 2–11

In Examples 2–11, the following procedure is used to evaluate performance properties of the hollow fiber membranes.

After the fiber is dried, the fibers are tested for permeation properties. The test device is a pressure vessel with four ports, two tubesheet ports, one feed port through which the compressed gas enters the vessel, and an exit or purge port through which the compressed gas can be purged from the vessel. Two hundred ten (210) fibers are passed into one of the tubesheet ports and out the other, allowing for a 31.5 cm length of the fibers to be contained within the test device. Epoxy tubesheets are formed in the two tubesheet ports to give a leak-tight bond between the fiber and the two ports. Test units are then pressurized with nitrogen at 50 psig by allowing compressed nitrogen to enter the test device through the feed port while leaving the exit port closed. The exit port is then opened for two minutes to purge the vessel of air and then closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports where the flowrate is measured either by means of bubble or mass flow meters. There is negligible back pressure on the gas exiting the tubesheet. After testing with nitrogen, the feed gas is changed to oxygen and the vessel is purged for about two minutes to give pure oxygen at 50 psig in the test device. The amount of oxygen permeating through the fiber walls is measured by combining the ouputs from the two tubesheet ports. From these flow measurements, the gas permeation rates and separation factor can be calculated by use of the following equations.

$$\text{Nitrogen flux} = \frac{\text{Measured flow } (cm^3/min) \ (STP)}{\text{surface area of fiber } (cm^2 \times \text{pressure})\ (cm\ Hg) \times 60\ (\text{seconds/minute})}$$

$$\text{Oxygen flux} = \frac{\text{Measured flow } (cm^3) \ (STP)}{\text{surface area of fiber } (cm^2) \times \text{pressure}\ (cm\ Hg) \times 60\ (\text{seconds/minute})}$$

The units are $cm^3(STP)/(cm^2\ sec\ cm\ Hg)$.
Measured flow = standard cubic centimeters / minute.
Surface area of fibers = 3.14 x OD (outside diameter, cm) × length x the number of fibers.
Pressure (cm Hg) = psi x 76 /14.7.
Separation factor is defined as the Oxygen flux divided by the Nitrogen flux.

EXAMPLE 2

Effect of Alcohol Pretreatment on Level of Residual Solvent and Membrane Performance Hollow fiber membranes are prepared by extruding a blend of 52.0 weight percent tetrabromobisphenol A polycarbonate, 32.5 weight percent N-methylpyrrolidone (solvent), and 15.5 weight percent triethylene glycol (non-solvent). The fibers are extruded at about 75 to about 80 degrees Celsius, quenched in a water bath at less than about 5 degrees Celsius, leached and annealed in water at about 90 degrees Celsius. The fibers possess a nominal size of 90×140 microns.

The fibers are immersed, respectively, in solutions containing about 25, 50, 75, and 100 volume percent concentrations of methanol at room temperature for about 1 to about 3 hours. For comparison, additional fibers are immersed in water only at room temperature for 1 day and 40 days respectively before being dried in air. The fibers are then dried in a hood with air blowing at a rate of about 40 to about 60 scfm at room temperature for about 2 hours. The levels of residual solvent in the various samples are determined by gas chromatography as described in Example 1. Test units are assembled, the fluxes of oxygen and nitrogen measured, and the separation factors calculated. Data are tabulated in Table II.

TABLE II

EFFECT OF ALCOHOL PRETREATMENT ON LEVEL OF RESIDUAL SOLVENT AND MEMBRANE PERFORMANCE

| Treatment | $O_2/N_2$ Separation Factor | Oxygen Flux $\frac{cm^3 (STP)}{cm^2\ s\ cm\ Hg} \times 10^6$ | Residual N—methyl pyrrolidone (weight %) |
|---|---|---|---|
| $H_2O$/1 Day | 6.4 | 5.9 | 1.78 |
| $H_2O$/24 Days | 6.7 | 10.0 | 0.20 |
| 25% Methanol | 6.9 | 9.9 | 0.06 |
| 50% Methanol | 7.1 | 8.9 | 0.02 |
| 75% Methanol | 7.2 | 6.2 | <0.01 |
| 100% Methanol | 6.9 | 3.0 | <0.01 |

The methanol solution remove residual N-methylpyrrolidone to very low levels with a corresponding increase in separation factor compared with the 1 day water immersed sample. The oxygen flux of the 25, 50, and 75 volume percent methanol treated samples are higher than the oxygen flux of the 1 day water immersed sample.

EXAMPLE 3

Effect of Alcohol Pretreatment on Membrane Performance of Membranes Initially Containing Different Levels of Residual Solvent Hollow fiber membranes are prepared in a manner similar to that described in Example 2. Samples of the fibers are immersed in water for 1, 2, and 60 days to produce fibers containing different levels of residual solvent. One-half of these water immersed fibers are then dried directly in air at room temperature for about 2 hours to serve as controls. The other one-half of the water immersed fibers are immersed in a solution containing about 25 volume percent methanol at room temperature for about 1 hour. These samples are then dried in room temperature air for about 2 hours. Test units are fabricated, gas fluxes measured, and separation factors calculated. Residual solvent concentrations are determined as described in Example 1. Data are tabulated in Table III.

TABLE III

EFFECT OF ALCOHOL PRETREATMENT ON MEMBRANES CONTAINING DIFFERENT INITIAL LEVELS OF RESIDUAL SOLVENT

| Sample | Residual N—Methyl pyrrolidone (weight %) | $O_2/N_2$ Separation Factor | Oxygen Flux $\frac{cm^3 (STP)}{cm^2\ sec\ cm\ Hg} \times 10^6$ |
|---|---|---|---|
| 1. Control | 3.20 | 6.6 | 2.2 |
| Treated | 0.36 | 6.8 | 6.0 |
| 2. Control | 1.98 | 6.4 | 3.8 |
| Treated | 0.48 | 6.8 | 7.9 |
| 3. Control | 1.78 | 6.4 | 5.9 |
| Treated | 1.04 | 6.5 | 8.9 |
| 4. Control | 0.20 | 6.7 | 10.0 |
| Treated | 0.06 | 6.9 | 9.9 |

The alcohol treated samples posses higher selectivity and gas fluxes than the control sample.

EXAMPLE 4

Effect of Pretreatment with Different Alcohols

Hollow fiber membranes are prepared in a manner similar to that described in Example 2. Samples of the fibers are immersed in solutions containing about 25 volume percent of one of methanol, ethanol, isopropyl alcohol, pentanol, and hexanol respectively at room temperature for 2 hours. The samples are then dried in a hood with air blowing at a rate of about 40 to about 60 scfm at room temperature for about 2 hours. A sample is also directly dried in air under the same condtions but without any pretreatment to serve as a control. Test units are fabricated. The fluxes of oxygen and nitrogen are determined at 25 degrees Celsius with a 50 psig pressure differential across the membrane. The separation factors for oxygen/nitrogen are calculated as the ratio of the oxygen flux/nitrogen flux. Data are shown in Table IV.

TABLE IV

EFFECT OF PRETREATMENT WITH DIFFERENT ALCOHOLS

| Alcohol | $O_2/N_2$ Separation Factor | Oxygen Flux $\frac{cm^3 (STP)}{cm^2\, s\, cm\, Hg}\times 10^6$ |
|---|---|---|
| Air Dry Only | 6.8 | 9.4 |
| Methanol | 6.8 | 10.2 |
| Ethanol | 7.5 | 7.8 |
| Isopropyl Alcohol | 6.4 | 4.3 |
| Pentanol | 5.2 | 2.3 |
| Hexanol | 4.1 | 1.1 |

The oxygen flux decreases with exposure to higher molecular weight alcohols.

EXAMPLE 5

Effect of Pretreatment with Different Concentrations of Alcohol

Samples of hollow fibers are prepared in a manner similar to that described in Example 2. Respective samples are immersed in solutions containing about 25, 50, and 100 volume percent of methanol and ethanol for 1 hour at room temperature. The samples are then dried in a hood with air blowing at a rate of about 40 to about 60 scfm at room temperature for 2 hours. A sample is also air dried in the same manner but without any pretreatment in an alcohol solution to serve as a control. Test devices are assembled for measuring the fluxes for oxygen and nitrogen and the separation factors for oxygen/nitrogen are calculated. Data are listed in Table VA.

TABLE VA

EFFECT OF PRETREATMENT WITH DIFFERENT CONCENTRATIONS OF ALCOHOL

| Concentration Alcohol (vol. %) | $O_2/N_2$ Separation Factor | Oxygen Flux $\frac{cm^3 (STP)}{cm^2\, s\, cm\, Hg}\times 10^6$ | Residual N—methyl-pyrrolidone (weight %) |
|---|---|---|---|
| Air Dry Only | 6.8 | 9.0 | 0.81 |
| Methanol | | | |
| 25% | 6.7 | 11.8 | 0.26 |
| 50% | 7.0 | 8.7 | 0.06 |
| 100% | 7.0 | 4.4 | 0.09 |
| Ethanol | | | |
| 25% | 6.8 | 11.2 | 0.23 |
| 50% | 7.4 | 7.3 | 0.12 |
| 100% | 7.3 | 2.8 | 0.09 |

The separation factor appears to increase with increasing concentration of alcohol up to about 50 weight percent alcohol. The oxygen flux decreases with increasing alcohol concentration.

Additional hollow fiber samples are immersed in solutions containing about 5 volume percent of isopropyl alcohol, n-butanol, and n-pentanol and about 10 volume percent of methanol, ethanol, isopropyl alcohol, n-butanol, and n-pentanol respectively at room temperature for about 1 hour. The samples are then dried in air at room temperature for 2 hours. A control sample stored in water for 57 days is also dried under the same conditions. Test units are fabricated, gas fluxes measured, and separation factors calculated as described in Example 2. Data are listed in Table VB.

TABLE VB

| Concentration Alcohol (vol. %) | $O_2/N_2$ Separation Factor | Oxygen Flux $\frac{cm^3 (STP)}{cm^2\, s\, cm\, Hg}\times 10^6$ |
|---|---|---|
| Air Dry Only | 6.9 | 10.4 |
| 5% | | |
| Isopropyl Alcohol | 6.9 | 16.4 |
| N—Butanol | 6.8 | 6.2 |
| N—Pentanol | 2.5 | 0.7 |
| 10% | | |
| Methanol | 7.0 | 13.7 |
| Ethanol | 7.0 | 15.4 |
| Isopropyl Alcohol | 7.0 | 13.1 |
| N—Butanol | 6.1 | 3.1 |
| N—Pentanol | 6.0 | 0.6 |

The samples treated with methanol, ethanol, and isopropyl alcohol have higher selectivities and fluxes than the control sample.

EXAMPLE 6

Effect of Pretreatment with Alcohol Mixtures

Samples of hollow fibers are prepared in a manner similar to Example 2. Samples are in immersed solutions containing various mixtures of methanol and ethanol for about 1 hour at room temperature. The samples are then dried in room temperature air for about 2 hours. The control sample is immersed in water for about 24 hours and then dried at room temperature in air for about 2 hours. Test units are fabricated and tested for gas permeability. Data are given in Table VI.

TABLE VI

EFFECT OF PRETREATMENT WITH ALCOHOL MIXTURES

| Concentration Alcohol (weight %) | $O_2/N_2$ Separation Factor | Oxygen Flux $\frac{cm^3 (STP)}{cm^2\, s\, cm\, Hg}\times 10^6$ |
|---|---|---|
| Air Dry Only | 6.4 | 7.1 |
| Methanol 2.5%/Ethanol 22.5% | 7.4 | 6.2 |
| Methanol 5%/Ethanol 45% | 7.4 | 3.3 |
| Methanol 10%/Ethanol 90% | 7.6 | 4.7 |
| Methanol 22.5%/Ethanol 2.5% | 6.4 | 9.4 |
| Methanol 45%/Ethanol 5% | 7.0 | 8.0 |
| Methanol 90%/Ethanol 10% | 6.9 | 3.5 |

The alcohol treated samples possess selectivities for oxygen/nitrogen equal to or greater than the untreated control sample.

EXAMPLE 7

Effect of Alcohol Pretreatment Time

Samples of hollow fibers are prepared in a manner similar to example 2. The samples are immersed in about 25 and 50 volume percent solutions of methanol for 0.5, 1, and 24 hours respectively at room temperature. The samples are then dried in air at room temperature for about 2 hours. A sample is also dried directly in air in the same manner without any pretreatment to serve as a control. Test unit are assembled and the fluxes of oxygen and nitrogen are measured and the separation factors calculated. Data shown in Table VII.

TABLE VII
EFFECT OF ALCOHOL PRETREATMENT TIME

| Concentration (vol. %) Time (hr.) | $O_2/N_2$ Separation Factor | Oxygen Flux $\frac{cm^3 \, (STP)}{cm^2 \, s \, cm \, Hg} \times 10^6$ |
|---|---|---|
| 25% | | |
| 0.5 | 6.3 | 9.6 |
| 1 | 6.4 | 9.5 |
| 24 | 6.5 | 9.4 |
| 50% | | |
| 0.5 | 6.7 | 9.4 |
| 1 | 6.5 | 9.0 |
| 24 | 6.6 | 8.5 |

The separation factor remains relatively constant over time with a corresponding slight decrease in the oxygen flux.

EXAMPLE 8

Effect of Alcohol Pretreatment Temperature

Hollow fibers are prepared in a manner similar to Example 2. The samples are contacted with the following alcohol solutions for about 1 hour at about 20 degrees Celsius and about 40 degrees Celsius respectively: 50 volume percent methanol, 50 volume percent ethanol, and a mixture of 25 volume percent methanol and 25 volume percent methanol. The samples are dried in air at room temperature for about 2 hours. A control sample is stored in room temperature water for about 24 hours, soaked in water at about 40 degrees Celsius for about 1 hour, and dried in room temperature air for about 2 hours. Test units are evaluated for gas permeability and the data are reported in Table VIII.

TABLE VIII

| Alcohol Concentration (vol. %) | $O_2/N_2$ Separation Factor | Oxygen Flux $\frac{cm^3 \, (STP)}{cm^2 \, s \, cm \, Hg} \times 10^6$ |
|---|---|---|
| Air Dry Only 40° C. | 6.4 | 10.3 |
| 50% Methanol | | |
| 20° C. | 6.9 | 9.2 |
| 40° C. | 7.0 | 8.4 |
| 50% Ethanol | | |
| 20° C. | 7.2 | 6.1 |
| 40° C. | 7.2 | 5.6 |
| 25% Methanol/25% Ethanol | | |
| 20° C. | 7.2 | 7.7 |
| 40° C. | 7.2 | 6.8 |

The alcohol treatments at 40 degrees Celsius result in a decreased gas flux compared with the alcohol treatments at 20 degrees Celsius.

EXAMPLE 9

Effect of Alcohol Pretreatment Solution Recirculating Rate

Hollow fibers are prepared in a manner similar to Example 2. The samples are contacted with an about 15 volume percent ethanol solution for about 3 hours at room temperature. The ethanol solution is recirculated at rates of about 0, 1.5, 2.5, and 3.6 liters/min. respectively. The samples are then dried in air at room temperature for about 6.5 hours at an air flowrate of about 6 scfm. Test units are made for measuring the oxygen and nitrogen fluxes and the separation factors calculated. Data are listed in Table IX.

TABLE IX
EFFECT OF ALCOHOL PRETREATMENT SOLUTION RECIRCULATION RATE

| Recirculation Rate (liters/min.) | $O_2/N_2$ Separation Factor | Oxygen Flux $\frac{cm^3 \, (STP)}{cm^2 \, s \, cm \, Hg} \times 10^6$ |
|---|---|---|
| 0 | 5.7 | 8.0 |
| 1.5 | 6.7 | 8.6 |
| 2.5 | 6.2 | 9.0 |
| 3.6 | 6.9 | 9.0 |

Recirculation of the extracting solution results in improved membrane performance over stagnant contacting with the extracting solution. This improvement is believed to be due to reduction of solvent and non-solvent concentrations in the boundary layer the membrane surface, resulting in more effective removal of the solvent and non-solvent from the membrane.

EXAMPLE 10

Effect of Alcohol Pretreatment on Membranes Containing Different Non-solvents

Hollow fiber membranes are prepared in a manner similar to Example 2 except the spin blend is made up of different non-solvents. Two different spin blend compositions are used: (1) 54.0 weight percent tetrabromobisphenol A polycarbonate, 35.8 weight percent -methylpyrrolidone (solvent), and 10.2 weight percent ethylene glycol (non-solvent); and (2) 52 weight percent tetrabromobisphenol A polycarbonate, 25 weight percent N-methylpyrrolidone (solvent), and 23 weight percent ethylene carbonate (non-solvent). Samples are dried directly in air without any pretreatment and additional samples are immersed in about 25 volume percent methanol at room temperature for about 2 hours, followed by drying in air any room temperature for about 2 hours in a hood with an air flowrate of about 40 to about 60 scfm. Devices are fabricated for evaluating membrane performance. The fluxes of oxygen and nitrogen are measured and the separation factors calculated. Data are tabulated in Table X.

TABLE X
EFFECT OF ALCOHOL PRETREATMENT ON MEMBRANES CONTAINING DIFFERENT NON-SOLVENTS

| Non-solvent | $O_2/N_2$ Separation Factor | Oxygen Flux $\frac{cm^3 \, (STP)}{cm^2 \, s \, cm \, Hg} \times 10^6$ |
|---|---|---|
| Ethylene Glycol | | |
| Air Dry Only | 7.8 | 0.4 |
| 25% Methanol | 5.1 | 1.5 |
| Ethylene Carbonate | | |
| Air Dry Only | 6.0 | 0.08 |
| 25% Methanol | 8.7 | 0.16 |

Exposure to the methanol solution significantly increases the flux.

EXAMPLE 11

Effect of Alcohol Vapor Pretreatment

Hollow fibers are prepared as described in Example 2. Samples are immersed in about 5, 25, 50, and 100 volume percent methanol and ethanol respectively for about 1 hour at room temperature, followed by drying in air at room temperature for about 2 hours. Wet fiber samples are also exposed to 100% volume percent methanol and ethanol vapor respectively while drying at room temperature for 2 hours. Additional samples are dried directly in air without any pretreatment and then some of these dry fibers are exposed to 100 volume percent methanol and ethanol vapor respectively for about 2 hours at room temperature. Test units are fabricated and evaluated for gas permeability. Data are shown in Table XI.

TABLE XI

EFFECT OF ALCOHOL VAPOR PRETREATMENT

| TREATMENT | $O_2/N_2$ Separation Factor | Oxygen Flux $\dfrac{cm^3 \ (STP)}{cm^2 \ s \ cm \ Hg} \times 10^6$ | Residual N-methyl Pyrrolidone (weight %) |
|---|---|---|---|
| Air Dry Only | 6.7 | 6.6 | 1.0 |
| 5% Methanol Liquid | 6.9 | 7.2 | 0.45 |
| 25% Methanol Liquid | 6.9 | 7.5 | 0.18 |
| 50% Methanol Liquid | 7.0 | 6.2 | 0.07 |
| 100% Methanol Liquid | 6.9 | 2.8 | 0.05 |
| 100% Methanol Vapor (wet fiber) | 7.0 | 5.6 | 0.91 |
| 100% Methanol Vapor (dry fiber) | 7.0 | 5.8 | 0.86 |
| 5% Ethanol Liquid | 6.8 | 6.7 | 0.23 |
| 25% Ethanol Liquid | 7.1 | 5.8 | 0.09 |
| 50% Ethanol Liquid | 7.3 | 4.6 | 0.09 |
| 100% Ethanol Liquid | 7.6 | 4.1 | 0.05 |
| 100% Ethanol Vapor (wet fiber) | 7.1 | 5.2 | 0.85 |
| 100% Ethanol Vapor (dry fiber) | 7.3 | 5.1 | .79 |

What is claimed is:

1. A process for drying a water-wet polycarbonate membrane comprising the steps of:
   A. contacting at least one side of the water-wet polycarbonate membrane with a pretreatment fluid containing at least one $C_{1-4}$ alcohol under conditions such that the alcohol modifies the membrane's morphological structure so that the gas selectivity of the membrane is thereby increased, and
   B. drying the membrane by contacting at least one side of the membrane with air or an inert gas under conditions such that substantially all of the alcohol and/or water is evaporated from the membrane.

2. The process of claim 1 wherein the pretreatment fluid is a liquid wherein at least one side of the membrane is contacted with the pretreatment liquid under conditions such that substantially all residual solvent and non-solvent are removed by the alcohol so that the gas flux of the membrane is thereby increased.

3. A process for drying a water-wet polycarbonate membrane comprising the steps of:
   A. contacting at least one side of the waterwet polycarbonate membrane with a pretreatment liquid containing at least one $C_{1-4}$ alcohol under conditions such that substantially all residual solvent and non-solvent are removed by the alcohol so that the gas flux of the membrane is thereby increased and such that the alcohol modifies the membrane's morphological structure so that the gas selectivity of the membrane is thereby increased, and
   B. drying the membrane by contacting at least one side of the membrane with air or an inert gas under conditions such that substantially all of the alcohol and/or water is evaporated from the membrane.

wherein the polycarbonate membrane is fabricated from polymers with backbone units corresponding to the formula:

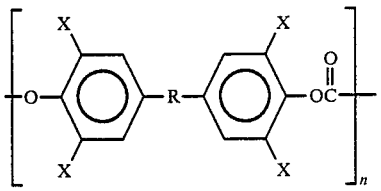

R is independently in each occurrence —CO—, —S—, —SO$_2$—, —O—, a $C_{1-6}$ divalent hydrocarbon radical, an inertly substituted $C_{1-6}$ hydrocarbon radical, or a $C_{1-16}$ divalent halocarbon radical;

X is independently at each occurrence H, Cl, Br, F, a $C_{1-4}$ alkyl, or a $C_{1-4}$ haloalkyl; and n is a positive real number of about 20 or greater.

4. The process claim 3 wherein
   R is a $C_{1-6}$ divalent hydrocarbon radical; and
   X is H, Cl, Br, F, or methyl.

5. The process of claim 4 wherein the polycarbonate membrane is an asymmetric or POWADIR membrane.

6. The process of claim 5 wherein the polycarbonate membrane is in hollow fiber form.

7. The process of claim 6 wherein the polycarbonate membrane is fabricated from 2,2-bis(3,5-dibromo-4-hydroxyphenyl)propane.

8. The process of claim 7 wherein the at least one $C_{1-4}$ alcohol is methanol, ethanol, or mixtures thereof.

9. The process of claim 8 wherein the alcohol has removed the solvent and non-solvent in the membrane to a level of less than about 0.1 weight percent.

10. The process of claim 9 wherein the alcohol concentration in the pretreatment solution is from about 5 to about 50 volume percent.

11. The process of claim 10 wherein the pretreatment solution temperature is between about 15 and about 60 degrees Celsius.

12. The process of claim 11 wherein the drying temperature is between about 10 and about 80 degrees Celsius.

13. The process of claim 9 wherein the dried membrane possesses a separation factor for oxygen/nitrogen of at least about 6.

14. The process of claim 13 wherein the dried membrane possesses an oxygen permeability of at least about 0.9 Barrers.

15. The process of claim 3 wherein the membrane is first contacted with water at a temperature of from about 30 to about 60 degrees Celsius for a time sufficient to remove at least a portion of the residual solvent and non-solvent from the membrane prior to pretreatment with the alcohol containing fluid.

16. A process for drying a water-wet polycarbonate membrane comprising the steps of:
   A. contacting at least one side of the water-wet polycarbonate membrane with a pretreatment fluid containing at least one $C_{1-4}$ alcohol under conditions such that the alcohol modifies the membrane's morphological structure so that the gas selectivity of the membrane is thereby increased, and B. drying the membrane by contacting at least one side of the membrane with air or an inert gas under conditions such that substantially all of the alcohol and/or water is evaporated from the membrane;

wherein the polycarbonate membrane is fabricated from polymers with backbone units corresponding to the formula:

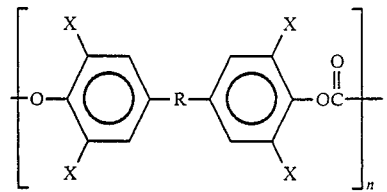

wherein
R is independently in each occurrence —CO—, —S—, —SO$_2$—, —O—, a C$_{1-6}$ divalent hydrocarbon radical, an inertly substituted C$_{1-6}$ hydrocarbon radical, or a C$_{1-16}$ divalent halocarbon radical;
X is independently at each occurrence H, Cl, Br, F, a C$_{1-4}$ alkyl, or a C$_{1-4}$ haloalkyl; and
n is a positive real number of about 20 or greater.

* * * * *

UNITED STATES PATENT AND TRADEMARK OFFICE
CERTIFICATE OF CORRECTION

PATENT NO. : 4,843,733

DATED : July 4, 1989

INVENTOR(S) : W. Admassu

It is certified that error appears in the above-identified patent and that said Letters Patent is hereby corrected as shown below:

Cover page, Col. 2, under heading References Cited, under subheading, U.S. Patent Documents, delete "4,715,960 12/1967" and insert -- 4,715,960 12/1987 --;

Col. 1, line 57, after "layer" insert -- supported on a porous substructure of a different material --;

Col. 4, lines 1 and 2, delete "co-pending U.S. Patent Application Serial No. 118,119, filed November 6, 1987," and insert -- U.S. Patent 4,772,392 --;

Col. 7, lines 6-9, delete "$\times 10^{10}$" and insert -- $10^{-10}$ --;

Col. 7, lines 18-21, delete "$\times 10^{10}$" and insert -- $10^{-10}$ --;

Col. 14, line 29, delete "-methylpyrrolidone" and insert --N-methylpyrrolidone--;

UNITED STATES PATENT AND TRADEMARK OFFICE
CERTIFICATE OF CORRECTION

PATENT NO. : 4,843,733            Page 2 of 2
DATED : July 4, 1989
INVENTOR(S) : W. Admassu It is certified that error appears in the above-identified patent and that said Letters Patent is hereby corrected as shown below:

Col. 14, line 37, delete "any" and insert -- at --;

Col. 16, line 27, after "process" insert -- of --.

Signed and Sealed this

Fourth Day of August, 1992

*Attest:*

DOUGLAS B. COMER

*Attesting Officer*      *Acting Commissioner of Patents and Trademarks*